United States Patent [19]

Tokuhashi et al.

[11] Patent Number: 5,526,184

[45] Date of Patent: Jun. 11, 1996

[54] HEAD-MOUNTED DISPLAY APPARATUS FOR OBSERVING AN OUTSIDE WORLD IMAGE AND/OR A DISPLAY IMAGE

[75] Inventors: Yuki Tokuhashi; Akiyoshi Tochigi; Satoshi Imai, all of Tokyo, Japan

[73] Assignee: Olympus Optical Co., Ltd., Tokyo, Japan

[21] Appl. No.: 163,693

[22] Filed: Dec. 9, 1993

[30] Foreign Application Priority Data

Dec. 10, 1992  [JP]  Japan ................... 4-330370

[51] Int. Cl.$^6$ .................... G02B 27/14; G02B 5/30
[52] U.S. Cl. .................... 359/630; 359/631; 359/495; 359/496
[58] Field of Search .................... 359/495, 496, 359/630, 631, 634, 486, 487

[56] References Cited

U.S. PATENT DOCUMENTS

| | | | |
|---|---|---|---|
| 3,508,809 | 4/1970 | Wilder | 359/495 |
| 3,677,621 | 7/1972 | Smith | 359/487 |
| 4,007,979 | 2/1977 | Coblitz | 359/487 |
| 4,963,003 | 10/1990 | Hiiro | 359/495 |
| 5,220,454 | 6/1993 | Ichihara | 359/495 |
| 5,223,956 | 6/1993 | Kramer | 359/495 |
| 5,383,053 | 1/1995 | Hegg | 359/486 |

FOREIGN PATENT DOCUMENTS

| | | |
|---|---|---|
| 59-164518 | 9/1984 | Japan . |
| 3191389 | 8/1991 | Japan . |

*Primary Examiner*—Georgia Y. Epps
*Assistant Examiner*—Ricky Mack
*Attorney, Agent, or Firm*—Cushman, Darby & Cushman

[57] ABSTRACT

A head-mounted display apparatus designed so that the utilization efficiency of display light from an image display device is increased and it is possible to control the brightness of an outside, real world image and also possible to shut off light from the outside. A liquid crystal display device (2) is disposed so that the direction of polarization of light emerging from the liquid crystal display device (2) is parallel to the plane of incidence on a polarization beam splitter (5) disposed in front of an observer's eye. The light emerging from the liquid crystal display device (2) is transmitted by the PBS (5) and reflected by a concave mirror (3) through a quarter-wave plate (6) disposed on the exit side of the PBS (5). The reflected light passes through the quarter-wave plate (6) and enters the PBS (5) again. Since the display light passes through the quarter-wave plate (6) twice during the round-trip travel, almost all the display light is reflected by the PBS (5) to enter the observer's eye. Accordingly, the light emerging from the liquid crystal display device (2) reaches the observer's eye with substantially no loss of light. With regard to light (4) from the outside world, a half of the incident light is reflected by the PBS (5), and the other half reaches the observer's eye.

18 Claims, 6 Drawing Sheets

HEAD-MOUNTED DISPLAY APPARATUS FOR OBSERVING AN OUTSIDE WORLD IMAGE AND/OR A DISPLAY IMAGE

BACKGROUND OF THE INVENTION

The present invention relates to a portable display apparatus and, more particularly, to a display apparatus designed to be mounted on the user's head to observe an electronic image or the like.

Figure 10:
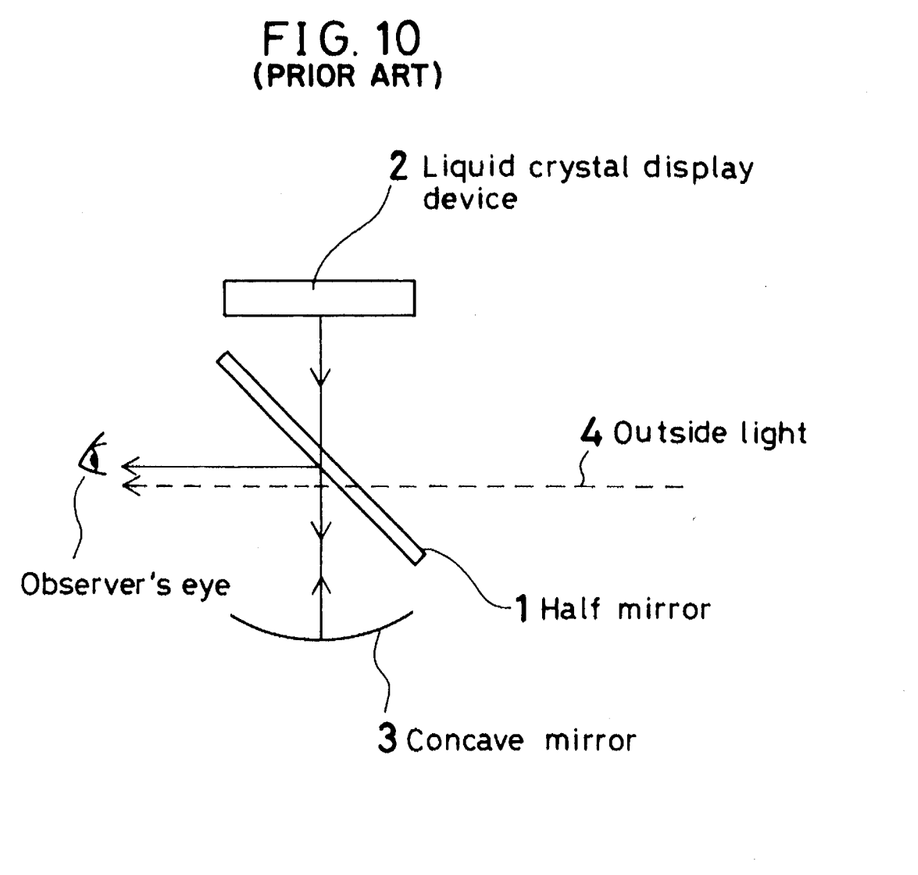
FIG. 10 shows the optical arrangement of a conventional head-mounted display apparatus.

There has heretofore been proposed a head-mounted display apparatus which enables an electronic image displayed on a liquid crystal display device to be viewed superimposed on an outside, real world image (see Japanese Patent Application Laid-Open (KOKAI) No. 03-191389 (1991)). The conventional display apparatus is arranged as shown in FIG. 10. A half-mirror 1 is obliquely disposed in front of an observer's eye, and a liquid crystal display device 2 is disposed off the observer's visual axis so that display light from the liquid crystal display device 2 is incident on the half-mirror 1. In addition, a concave mirror 3 is disposed to face the liquid crystal display device 2 across the half-mirror 1.

Accordingly, a part of the light from the liquid crystal display device 2 is transmitted by the half-mirror 1 and reflected by the concave mirror 3, and a part of the reflected light is reflected by the half-mirror 1 to reach the observer's eye. At the same time, a part of light from the outside world is also transmitted by the half-mirror 1 to reach the observer's eye. Accordingly, the observer can see both an enlarged electronic image from the liquid crystal display device 2 and an outside, real world image, which are superimposed on one another.

In this type of conventional display apparatus, however, the brightness of the electronic image observed is a quarter of that of the original electronic image because the display light passes through the half-mirror 1 twice before reaching the observer's eye. Therefore, the display efficiency is low. In addition, it is impossible to vary the brightness of the outside, real world image or to shut out light from the outside world.

SUMMARY OF THE INVENTION

In view of the above-described circumstances, it is an object of the present invention to provide a head-mounted display apparatus which is designed so that the utilization efficiency of display light from an image display device, i.e., a liquid crystal display device, is increased, and it is possible to control the brightness of an outside, real world image and also possible to shut off the light from the outside world.

To attain the above-described object, the present invention provides a head-mounted display apparatus having an image display device for displaying an image for observation, a partially transmitting-reflecting surface for partially transmitting and partially reflecting light from the image display device, and a mirror for enlargingly reflecting light transmitted by the partially transmitting-reflecting surface so that the reflected light is led to an observer's eye. The partially transmitting-reflecting surface is formed by a polarization beam splitter, and a polarization direction changing device is provided between the polarization beam splitter and the mirror to change the direction of polarization of light transmitted by the polarization beam splitter by at least 90° so that the transmitted light is led to the observer's eye.

In addition, the present invention provides a head-mounted display apparatus having an image display device for displaying an image for observation, a mirror disposed to face a display surface of the image display device to enlargingly reflect the image for observation, a partially transmitting-reflecting surface disposed between the image display device and the mirror to transmit at least a part of light directed from the image display device toward the mirror and to reflect at least a part of light reflected by the mirror to an observer's eye. The partially transmitting-reflecting surface further transmits at least a part of light from the outside world and leads it to the observer's eye. The partially transmitting-reflecting surface is formed by a polarization beam splitter, and a polarization direction changing device is provided between the polarization beam splitter and the mirror to change the direction of polarization of light transmitted by the polarization beam splitter by at least 90° so that the transmitted light is led to the observer's eye. In addition, a device for controlling the quantity of outside light passing through the polarization beam splitter is disposed on either the outside light entrance side or the observer's eye side of the polarization beam splitter.

According to the present invention, a polarization beam splitter is employed as a partially transmitting-reflecting surface, and a polarization direction changing device is disposed between the polarization beam splitter and an enlargingly reflecting mirror to change the direction of polarization of light passing through the polarization beam splitter. Accordingly, light from the image display device can be led to the observer's eye at high utilization efficiency, with substantially no loss of light. Thus, a bright enlarged electronic image can be observed.

In addition, by using a polarization beam splitter, an outside, real world image can be displayed superimposed on the electronic image, and it is possible to control the brightness of the outside image and also possible to shut off the outside light.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The head-mounted display apparatus of the present invention will be described below by way of preferred embodiments.

The basic principle of the present invention is as follows: The present invention is an improvement of a head-mounted display apparatus such as that shown in FIG. 10, which has a liquid crystal display device 2, a half-mirror 1 that partially transmits and partially reflects display light from the liquid crystal display device 2, and a concave mirror 3 that enlargingly reflects the light transmitted by the half-mirror 1 so that the reflected light is led to the observer's eye. In the present invention, a polarization beam splitter is employed in place of the half-mirror 1, and a quarter-wave plate is disposed between the polarization beam splitter and the concave mirror 3 to change 90° the direction of polarization of light that is transmitted by the polarization beam splitter and returned from the concave mirror 3, thereby eliminating the loss of the display light, and thus increasing the utilization efficiency of the light.

Figure 1:
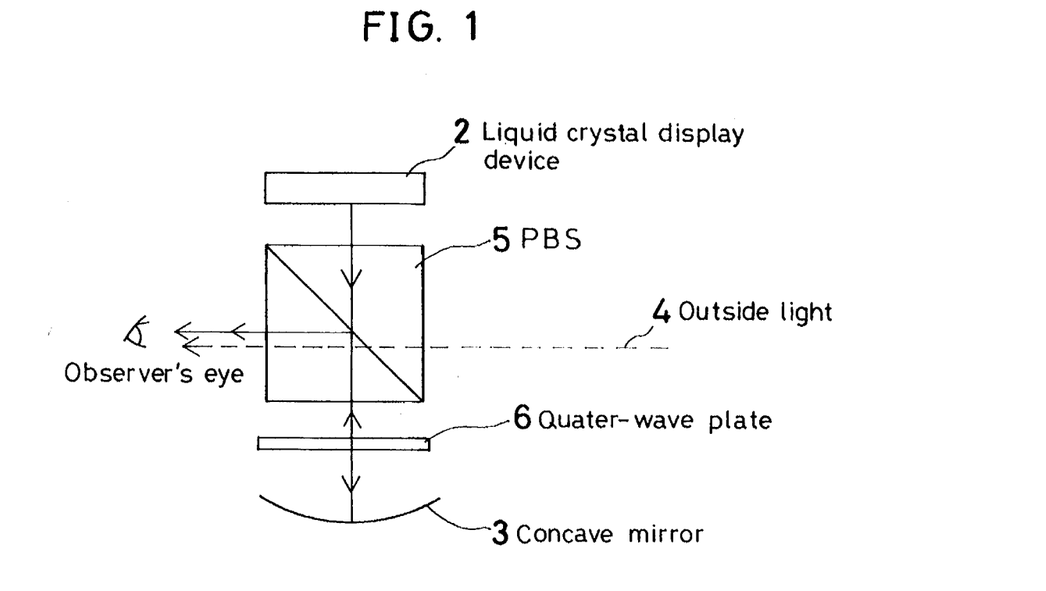
FIG. 1 shows the optical arrangement of a first embodiment of the head-mounted display apparatus according to the present invention.

FIG. 1 shows the optical arrangement of a first embodiment of the head-mounted display apparatus according to the present invention. Light emerging from the liquid crystal display device 2 is, generally, linearly polarized. Therefore, the liquid crystal display device 2 is disposed so that the direction of the polarized light is parallel (p-polarized light) to the plane of incidence on a polarization beam splitter (hereinafter referred to as "PBS") 5 which is disposed in front of an observer's eye. Consequently, almost all the light emerging from the liquid crystal display device 2 passes through the PBS 5 and is reflected by the concave mirror 3 through a quarter-wave plate 6 which is disposed on the exit side of the PBS 5. The reflected light passes through the quarter-wave plate 6 and enters the PBS 5 again. Since it passes through the quarter-wave plate 6 twice during the round-trip travel, the display light becomes s-polarized light. Therefore, almost all the display light is reflected by the PBS 5 to enter the observer's eye. Accordingly, the light emerging from the liquid crystal display device 2 reaches the observer's eye with substantially no loss of light. With regard to light 4 from the outside world, a half of the incident light is reflected by the PBS 5, and the other half reaches the observer's eye in the same way as in the conventional head-mounted display apparatus.

By virtue of the above-described arrangement, when the head-mounted display apparatus is used to observe both an electronic image displayed by the liquid crystal display device 2 and an outside, real world image, which are superimposed on one another, a bright enlarged electronic image can be observed with a minimal loss of light that forms the electronic image.

Figure 2:
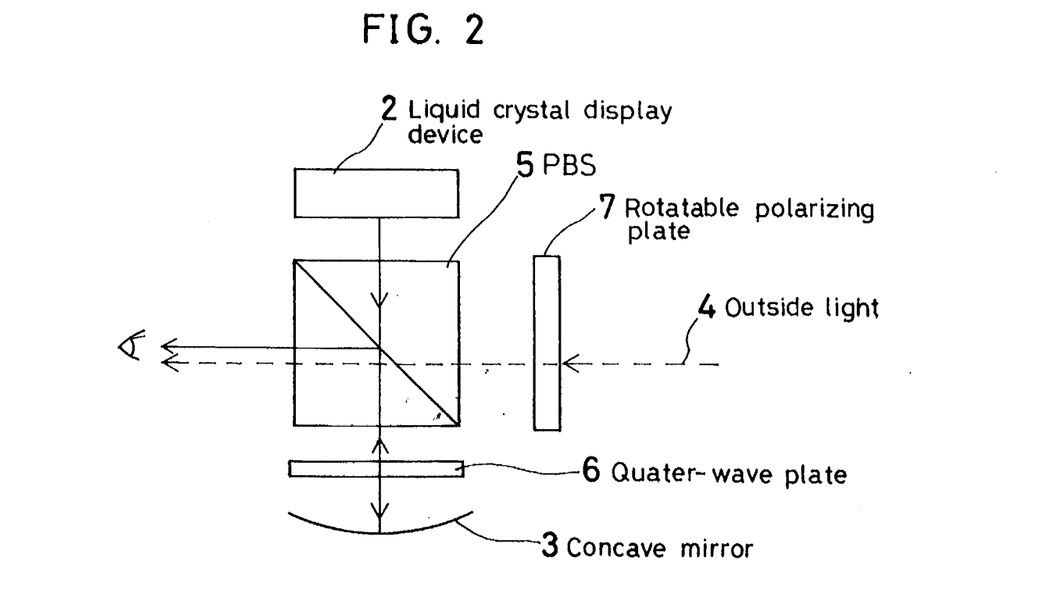
FIG. 2 shows the optical arrangement of a second embodiment of the head-mounted display apparatus according to the present invention.

FIG. 2 shows another embodiment of the present invention, which differs from the first embodiment, shown in FIG. 1, in that a rotatable polarizing plate 7 is provided as a shutter for intercepting the outside light 4 at the side of the PBS 5 from which the outside light 4 enters. When the axis of transmission of the polarizing plate 7 is rotated so that the polarization direction of light is parallel (p-polarized light) to the plane of incidence on the PBS 5, almost all the outside light 4 passes through the PBS 5 and reaches the observer's eye. However, when the transmission axis of the polarizing plate 7 is rotated so that the outside light 4 becomes s-polarized light, the outside light 4 cannot pass through the PBS 5, so that no outside world image reaches the observer's eye. When the transmission axis of the polarizing plate 7 is set at an angle intermediate between those for p-polarized light and s-polarized light, the quantity of transmitted light decreases. Thus, the quantity of light transmitted through the PBS 5 can be controlled according to the angle of inclination of the transmission axis of the polarizing plate 7. The arrangement of this embodiment enables the display apparatus to be thinner and less costly than in the case of an arrangement that employs a liquid crystal shutter (described later). It should be noted that the surface of the liquid crystal display device 2 is preferably provided with an antireflection coating in order to prevent light reflected by the PBS 5 from reflecting at the liquid crystal display device 2 when the brightness of the outside image is raised. It is a matter of course that a mechanical shutter may be employed in place of the rotatable polarizing plate 7.

Figure 3:
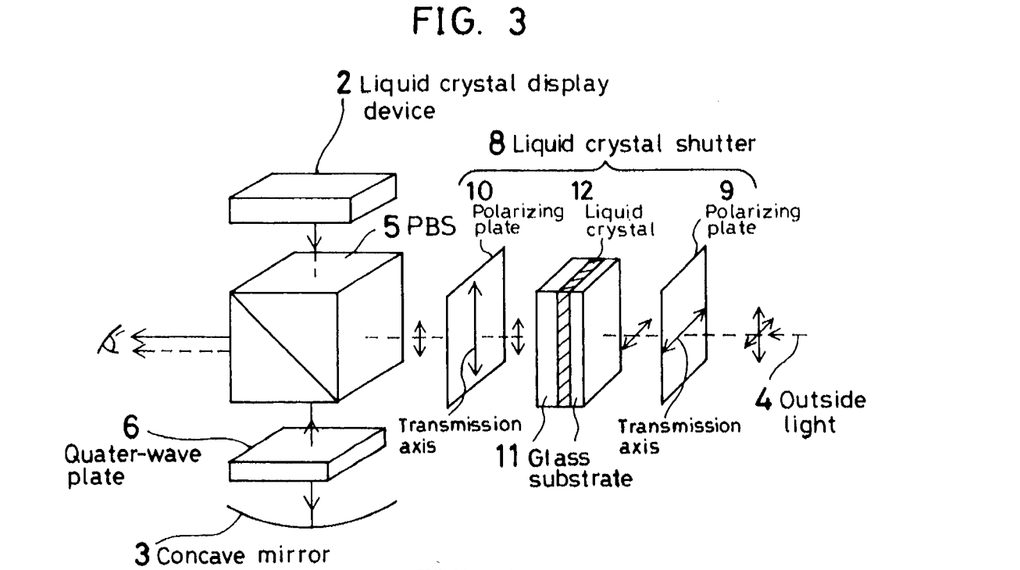
FIG. 3 shows the optical arrangement of a third embodiment of the head-mounted display apparatus according to the present invention.

FIG. 3 shows a third embodiment of the present invention, in which a liquid crystal shutter 8 is employed in place of the rotatable polarizing plate 7. The liquid crystal shutter 8 is composed, for example, of two polarizing plates 9 and 10, and a twisted nematic liquid crystal 12 sandwiched between two glass substrates 11 and disposed between the polarizing plates 9 and 10. In the case of such a positive type liquid crystal shutter 8, wherein the transmission axes of the polarizing plates 9 and 10 perpendicularly intersect each other, when no voltage is applied to the liquid crystal 12, the plane of polarization of light passing through the polarizing plate 9 is rotated through 90° by the liquid crystal 12, and the light passes through the polarizing plate 10 to reach the observer's eye. When a voltage is applied to the liquid crystal 12, on the other hand, the light passing through the polarizing plate 9 enters the polarizing plate 10 as it is, without the plane of polarization being rotated. Therefore, the light is intercepted by the polarizing plate 10. Since the direction of the plane of polarization of light passing through the liquid crystal 12 can be controlled by varying the voltage applied to the liquid crystal 12, the quantity of light passing through the polarizing plate 10 can be varied according to the applied voltage. Thus, the brightness of the outside image can be varied. It should be noted that the direction of the transmission axis of the polarizing plate 10 is predetermined so that light passing through the polarizing plate 10 becomes p-polarized light with respect to the PBS 5.

With the above-described arrangement, almost all the light passing through the liquid crystal shutter 8 reaches the observer's eye, and hence the utilization efficiency of the outside light 4 increases. It should be noted that the polarizing plate 10 may be omitted because the system is arranged such that the outside light 4 eventually passes through the PBS 5.

Although the positive type liquid crystal shutter 8 is employed in the described embodiment, it is also possible to employ a negative type liquid crystal shutter in which the transmission axes of the polarizing plates 9 and 10 lie parallel to each other. In such a case also, the direction of the transmission axis of the polarizing plate 10 is predetermined so that light passing through the polarizing plate 10 becomes p-polarized light with respect to the PBS 5.

Further, the liquid crystal 12 is not necessarily limited to a twisted nematic liquid crystal but may be a supertwisted nematic liquid crystal.

Figure 4:
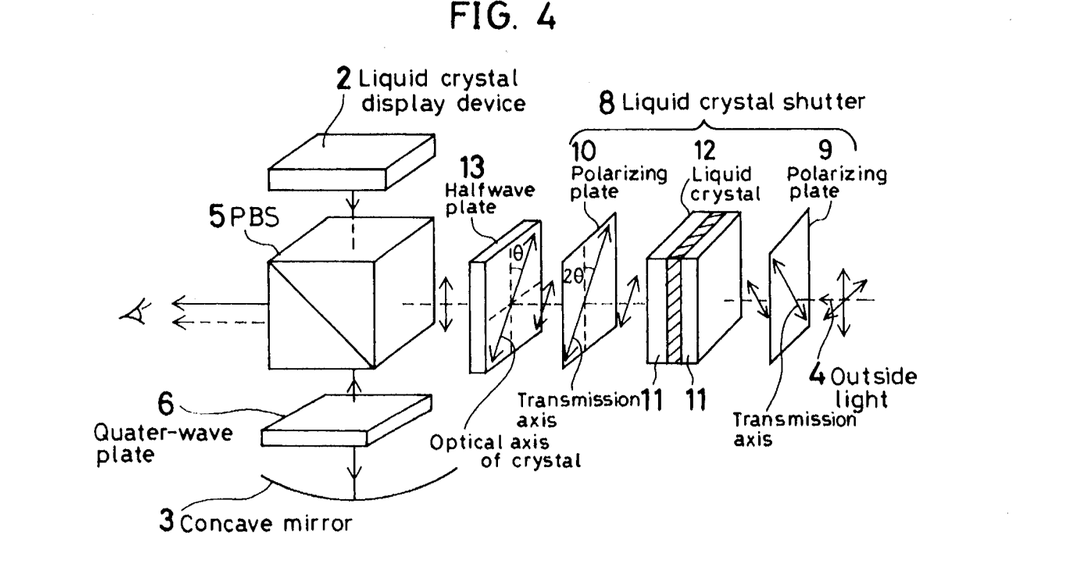
FIG. 4 shows the optical arrangement of a fourth embodiment of the head-mounted display apparatus according to the present invention.

FIG. 4 shows a modification of the embodiment shown in FIG. 3. In a case where the transmission axis of the polarizing plate 10 is not parallel to the plane of incidence on the PBS 5 but at an angle $2\Theta$ to it, a halfwave plate 13 is disposed between the liquid crystal shutter 8 and the PBS 5, thereby making it possible to rotate the polarization direction of light entering the PBS 5. For example, when the angle $2\Theta=45°$, the optical axis of the crystal of the halfwave plate 13 is set at an angle $\Theta=22.5°$ to the plane of incidence on the PBS 5, thereby allowing almost all the light passing through the halfwave plate 13 to reach the observer's eye. Thus, the utilization efficiency of the outside light 4 increases.

In this case also, the positive type liquid crystal shutter 8 may be replaced by a negative type liquid crystal shutter, and the direction of the transmission axis of the polarizing plate 10 is predetermined so that light passing through the halfwave plate 13 becomes p-polarized light. Further, the liquid crystal 12 is not necessarily limited to a twisted nematic liquid crystal but may be a supertwisted nematic liquid crystal.

Figure 5:
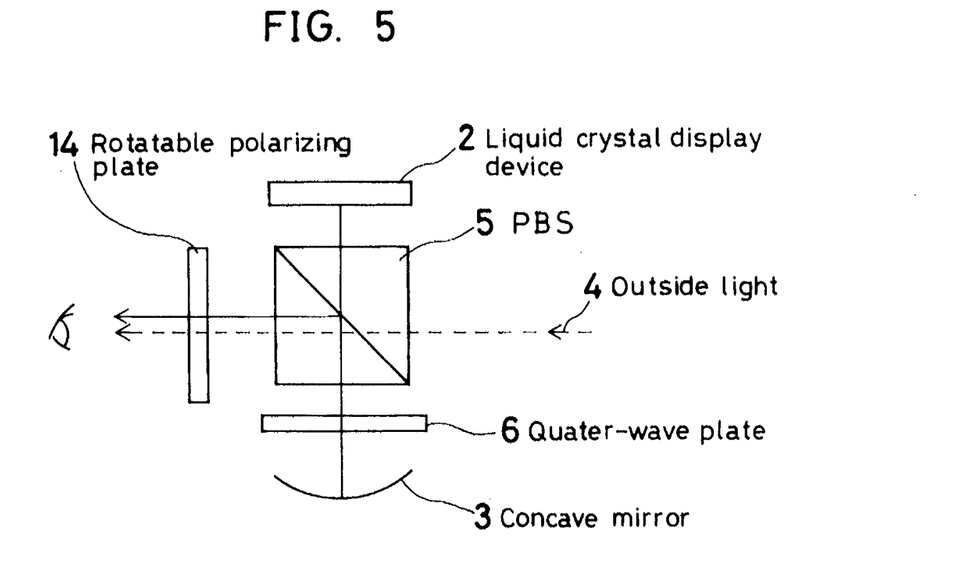
FIG. 5 shows the optical arrangement of a fifth embodiment of the head-mounted display apparatus according to the present invention.

FIG. 5 shows the optical arrangement of a further embodiment of the present invention. This embodiment has a rotatable polarizing plate 14 which is disposed between the PBS 5 and the observer's eye in addition to the arrangement shown in FIG. 1. Light from the liquid crystal display device 2 and the outside light 4 are combined together in the PBS 5. Since the polarization direction of the display light and that of the outside light 4 are perpendicular to each other, the transmittance of each light changes by changing the direction of the transmission axis of the polarizing plate 14. For example, when the direction of the transmission axis of the polarizing plate 14 is made perpendicular to the plane of the drawing, the greater part of the light from the liquid crystal display device 2 passes through the polarizing plate 14, whereas the outside light 4 is shut out. On the other hand, when the direction of the transmission axis is made parallel to the plane of the drawing, the greater part of the display light is intercepted, and only the outside light 4 passes through the polarizing plate 14.

Thus, it is possible to observe both an electronic image displayed on the liquid crystal display device 2 and an outside image, which are superimposed on one another, and control the brightness of the images, and it is also possible to observe only one of the two images. It should be noted that it is possible to shut off light and vary the intensity of light even more perfectly by using a mechanical shutter in combination with the arrangement of this embodiment and by controlling the brightness of the image displayed on the liquid crystal display device 2.

Figures 6A, 6B:
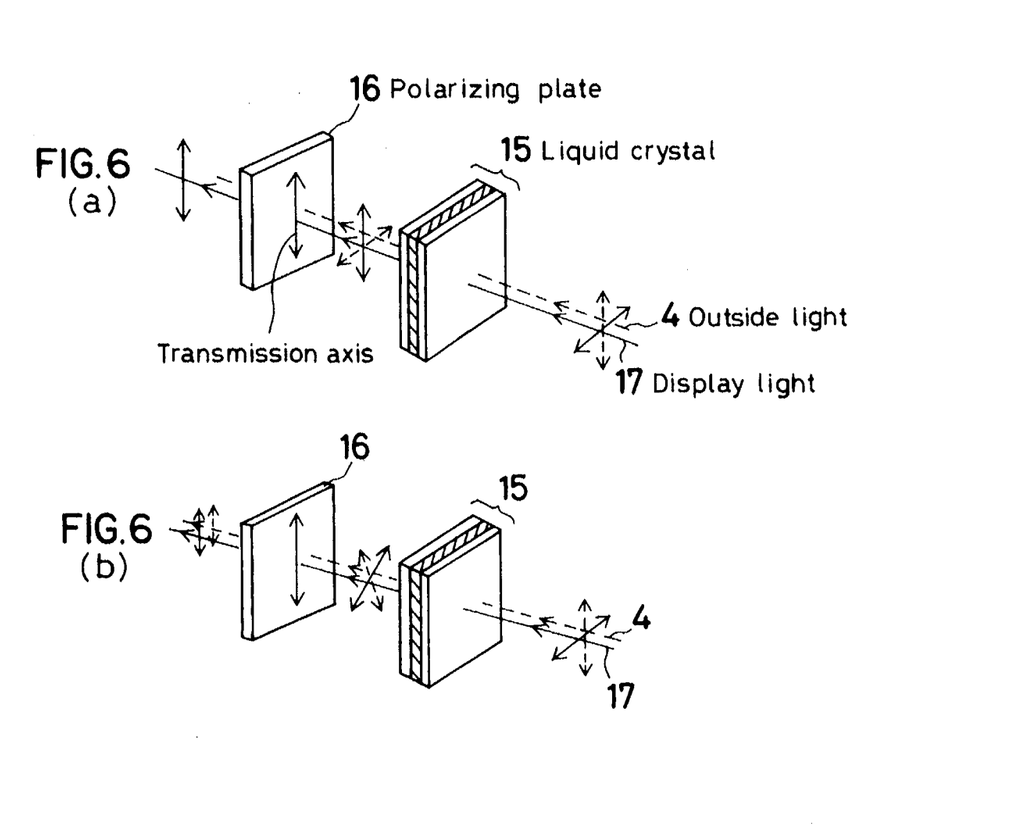
FIGS. 6(a) and 6(b) show an essential part of a modification of the fifth embodiment and the function thereof.

It should be noted that a combination of a liquid crystal 15 and a fixed polarizing plate 16 may be employed, as shown in FIGS. 6(*a*), 6(*b*), 7(*a*), 7(*b*), 8(*a*) and 8(*b*), in place of the rotatable polarizing plate 14 shown in FIG. 5. By varying the voltage applied to the liquid crystal 15, the direction of polarization of light passing through the liquid crystal 15 changes, and the quantities of display light 17 and outside light 4 passing through the polarizing plate 16 change accordingly.

FIGS. 6(*a*) and 6(*b*) show one example of an arrangement in which a twisted nematic liquid crystal is employed as the liquid crystal 15. FIG. 6(*a*) shows an operating mode in which the plane of polarization of the transmitted light is rotated through 90° with no voltage applied to the liquid crystal 15. In this case, only the display light 17 reaches the observer's eye. FIG. 6(*b*) shows an operating mode in which a voltage is applied to the liquid crystal 15 so that the plane of polarization of the transmitted light rotates about 45°. In this case, both the display light 17 and the outside light 4 reach the observer's eye.

Figure 7A:
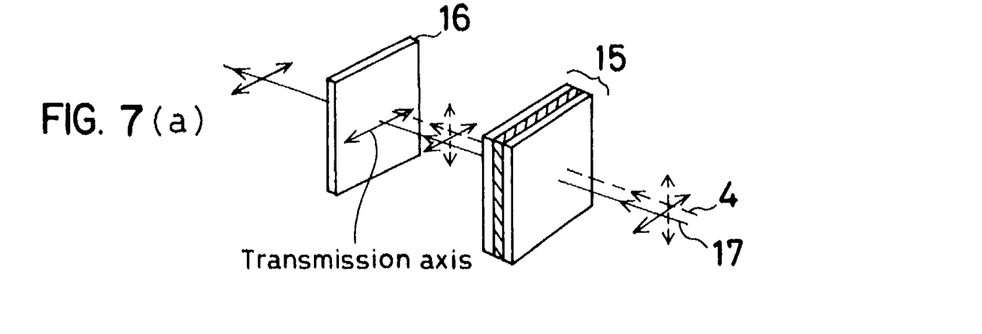
FIGS. 7(a) and 7(b) show an essential part of another modification of the fifth embodiment and the function thereof.
Figure 7B:
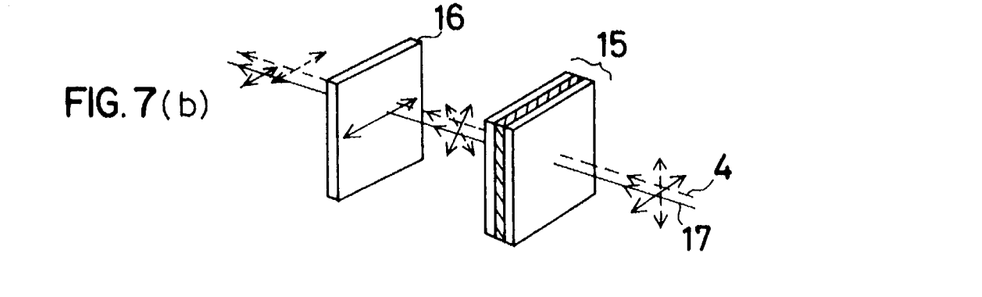

Another example is shown in FIGS. 7(*a*) and 7(*b*). FIG. 7(*a*) shows an operating mode in which a voltage is applied to the liquid crystal 15 so that the plane of polarization of the transmitted light does not rotate. In this case, only the display light 17 reaches the observer's eye. FIG. 7(*b*) shows an operating mode in which a voltage is applied to the liquid crystal 15 so that the plane of polarization of the transmitted light rotates about 45°. In this case, both the display light 17 and the outside light 5 reach the observer's eye.

Figure 8A:
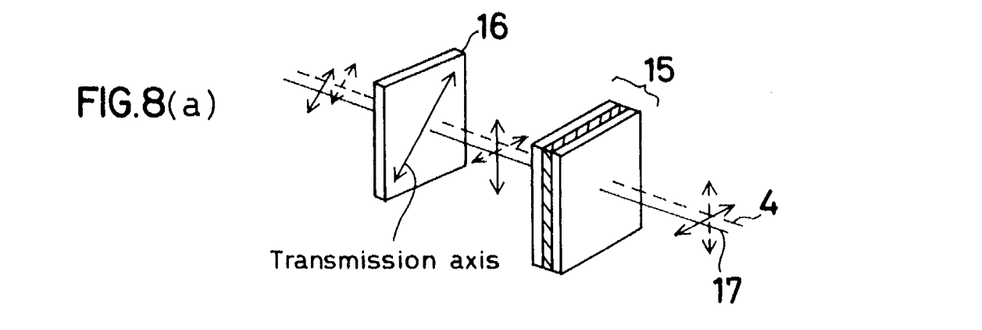
FIGS. 8(a) and 8(b) show an essential part of still another modification of the fifth embodiment and the function thereof.
Figure 8B:
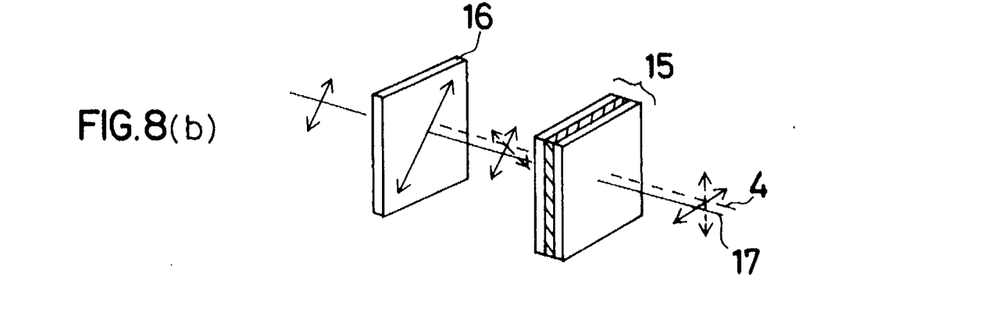

Still another example is shown in FIGS. 8(*a*) and 8(*b*). FIG. 8(*a*) shows an operating mode in which the plane of polarization of the transmitted light is rotated through 90° with no voltage applied to the liquid crystal 15. In this case, both the display light 17 and the outside light 4 reach the observer's light. FIG. 8 (*b*) shows an operating mode in which a voltage is applied to the liquid crystal 15 so that the plane of polarization of the transmitted light rotates 45°. In this case, only the display light 17 reaches the observer's eye.

Although some modifications have been described above, the relationship between the liquid crystal 15 and the transmission axis of the polarizing plate 16 is not necessarily limited to those in the above-described examples.

The above-described arrangement has an advantage in that it has no mechanically moving parts.

Figure 9A:
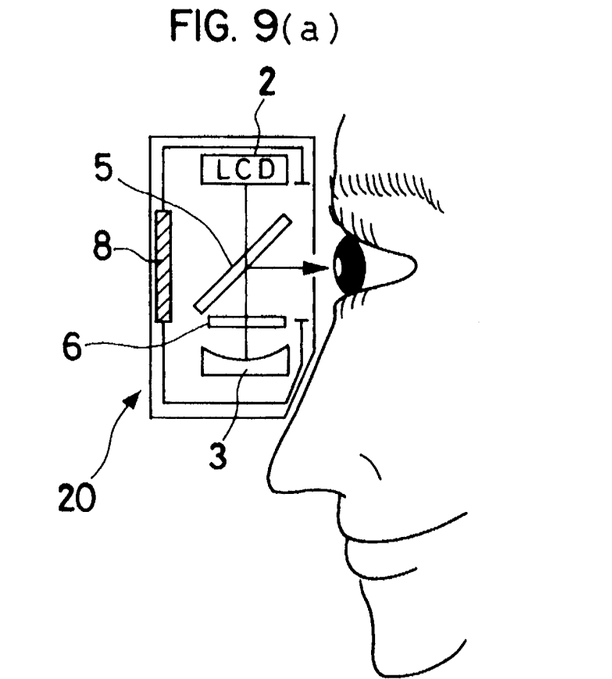
FIGS. 9(a) and 9(b) show the whole arrangement of one example of the head-mounted display apparatus according to the present invention.
Figure 9B:
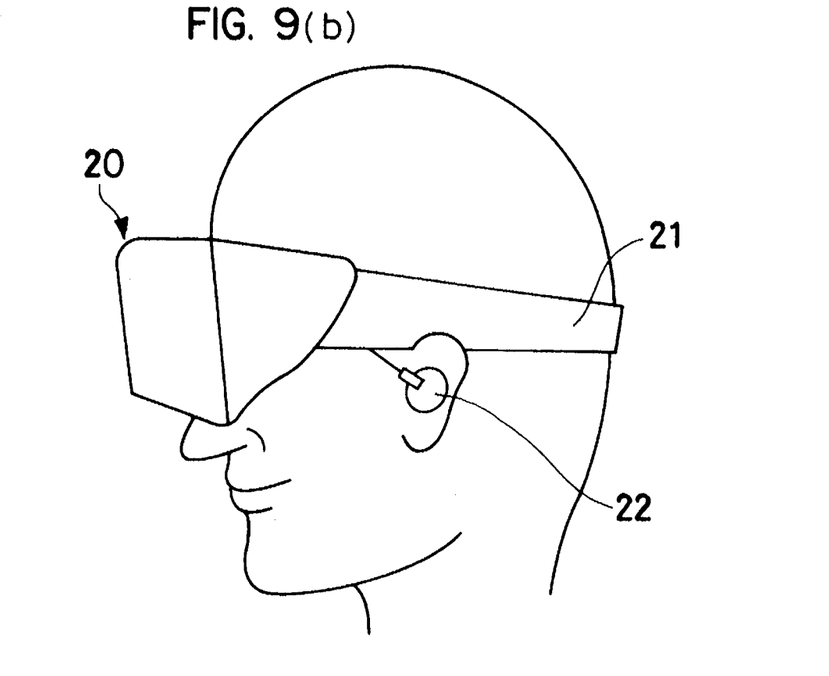

FIGS. 9(*a*) and 9(*b*) show the general arrangement of one example of the head-mounted display apparatus according to the present invention. FIG. 9(*a*) is a sectional view of the head-mounted display apparatus when mounted on the observer's head. FIG. 9(*b*) is a perspective view of the head-mounted display apparatus mounted on the observer's head. FIG. 9(*a*) shows a head-mounted display apparatus 20 that employs a liquid crystal shutter 8 such as that shown in FIG. 3. When the head-mounted display apparatus 20 is arranged in the form of a goggle-type display apparatus, for example, a head band 21 is employed so that the display apparatus 20 can be secured to the observer's head, as shown in FIG. 9(*b*). In addition, an earphone 22 is integrally incorporated in the display apparatus 20 to enable the user to enjoy listening to sound while observing an electronic image displayed on the liquid crystal display device 2.

Although the head-mounted display apparatus of the present invention has been described above by way of some embodiments, it should be noted that the present invention is not necessarily limited to the described embodiments and that various changes and modifications may be imparted thereto. For example, although in the foregoing embodiment a prism-type polarization beam splitter is employed, it is also possible to use a flat plate-type polarization beam splitter.

As will be clear from the foregoing description, the head-mounted display apparatus of the present invention employs a polarization beam splitter as a partially transmitting-reflecting surface, and a polarization direction changing device is disposed between the polarization beam splitter and an enlargingly reflecting mirror to change the direction of polarization of light passing through the polarization beam splitter. Accordingly, light from the image display device can be led to the observer's eye at high utilization efficiency, with substantially no loss of light. Thus, a bright enlarged electronic image can be observed.

In addition, by using a polarization beam splitter, an outside, real world image can be displayed superimposed on the electronic image, and it is possible to control the brightness of the outside image and also possible to shut off the outside light.

What we claim is:

1. A head-mounted display apparatus comprising:

image display means for displaying an image for observation;

a polarization beam splitter forming a partially transmitting-reflecting surface to partially transmit and partially reflect light from said image display means; and a mirror which enlarges reflected light transmitted by said partially transmitting-reflecting surface, said mirror facing said image display means across said polarization beam splitter;

a first optical axis extending from an outside world to an observer's eye for observation of an outside world image;

a second optical axis connecting said image display means and said mirror through said polarization beam splitter, said second optical axis intersecting said first optical axis; and polarization direction changing means for changing a direction of polarization of light transmitted by said polarization beam splitter by at least 90° so that said light transmitted by said polarization beam splitter is reflected by said mirror and then reflected by said polarization beam splitter so as to be led to said observer's eye.

2. A head-mounted display apparatus according to claim 1, wherein:

said polarization direction changing means is a quarter-wave plate.

3. A head-mounted display apparatus according to claim 1, wherein:

said mirror is a concave mirror.

4. A head-mounted display apparatus according to claim 1, wherein:

said polarization beam splitter is a prism-type polarization beam splitter.

5. A head-mounted display apparatus according to claim 1, wherein:

said image display means is a liquid crystal display device.

6. A head-mounted display apparatus according to claim 5, wherein:

an antireflection coating is provided on a surface of said liquid crystal display device.

7. A head-mounted display apparatus comprising:

image display means for displaying an image for observation;

a mirror, facing a display surface of said image display means, to enlargingly reflect said image for observation;

a polarization beam splitter forming a partially transmitting-reflecting surface disposed between said image display means and said mirror, to transmit at least a part of light directed from said image display means toward said mirror and to reflect at least a part of light reflected by said mirror to an observer's eye, said partially transmitting-reflecting surface further transmitting at least a part of light from the outside world and leading it to said observer's eye;

polarization direction changing means provided between said polarization beam splitter and said mirror to change a direction of polarization of light transmitted by said polarization beam splitter by at least 90° so that said light transmitted by said polarization beam splitter is led to said observer's eye; and means for controlling a quantity of outside world light passing through said polarization beam splitter, said means for controlling being disposed on one of a first optical axis extending from said polarization beam splitter to said observer's eye, and a second optical axis extending from the outside world to said polarization beam splitter.

8. A head-mounted display apparatus according to claim 7, wherein:

said polarization direction changing means is a quarter-wave plate.

9. A head-mounted display apparatus according to claim 7, wherein:

said mirror is a concave mirror.

10. A head-mounted display apparatus according to claim 7, wherein:

said polarization beam splitter is a prism-type polarization beam splitter.

11. A head-mounted display apparatus according to claim 7, wherein:

said image display means is a liquid crystal display device.

12. A head-mounted display apparatus according to claim 11, wherein:

an antireflection coating is provided on a surface of said liquid crystal display device.

13. A head-mounted display apparatus according to claim 7, wherein:

said means for controlling said quantity of outside world light passing through said polarization beam splitter is a polarizing plate rotatably disposed on an outside light entrance side of said polarization beam splitter.

14. A head-mounted display apparatus according to claim 7, wherein:

said means for controlling said quantity of outside world light passing through said polarization beam splitter is a polarizing plate rotatably disposed on an observer's eye side of said polarization beam splitter.

15. A head-mounted display apparatus according to claim 7, wherein:

said means for controlling said quantity of outside world light passing through said polarization beam splitter is a liquid crystal shutter disposed on an outside light entrance side of said polarization beam splitter.

16. A head-mounted display apparatus according to claim 15, further comprising:

a halfwave plate disposed between said liquid crystal shutter and said polarization beam splitter.

17. A head-mounted display apparatus according to claim 7, wherein:

said means for controlling said quantity of outside world light passing through said polarization beam splitter comprises at least one polarizing plate and a liquid crystal in order as viewed from outside of said head-mounted display apparatus on an outside light entrance side of said polarization beam splitter.

18. A head-mounted display apparatus according to claim 7, wherein:

said means for controlling said quantity of outside world light passing through said polarization beam splitter comprises at least one polarizing plate and a liquid crystal in order as viewed from said observer's eye on an observer's eye side of said polarization beam splitter.

\* \* \* \* \*